US008466874B1

(12) United States Patent
Gardiner

(10) Patent No.: US 8,466,874 B1
(45) Date of Patent: Jun. 18, 2013

(54) SYSTEM AND METHOD FOR GRAPHICAL RENDERING OF POINT PRIMITIVES

(75) Inventor: Harold Dee Gardiner, Sandy, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1165 days.

(21) Appl. No.: 12/368,866

(22) Filed: Feb. 10, 2009

(51) Int. Cl.
*G06F 3/038* (2006.01)
*G09G 5/08* (2006.01)

(52) U.S. Cl.
USPC .................. 345/157; 345/7; 345/156; 315/9; 315/13.1; 701/1

(58) Field of Classification Search
USPC .......... 345/156, 157, 7–8; 315/9, 13.1; 701/1, 701/3, 4, 33.9, 120, 400, 528
See application file for complete search history.

(56) References Cited

U.S. PATENT DOCUMENTS

| | | | | |
|---|---|---|---|---|
| 2,930,035 | A | 3/1960 | Altekruse | |
| 2,965,894 | A | 12/1960 | Sweeney | |
| 2,994,966 | A | 8/1961 | Senitsky et al. | |
| 3,153,234 | A | 10/1964 | Begeman et al. | |
| 3,312,088 | A | 10/1965 | Alexander et al. | |
| 3,241,141 | A | 3/1966 | Wall | |
| 3,325,807 | A | 6/1967 | Burns et al. | |
| 3,373,423 | A | 3/1968 | Levy | |
| 3,397,397 | A | 8/1968 | Barney | |
| 3,739,380 | A | 6/1973 | Burdle et al. | |
| 3,815,132 | A | 6/1974 | Case, Jr. et al. | |
| 3,866,222 | A | 2/1975 | Young | |
| 4,654,665 | A | 3/1987 | Kiuchi et al. | |
| 4,760,396 | A | 7/1988 | Barney et al. | |
| 5,815,143 | A * | 9/1998 | Jenney et al. | 345/563 |
| 5,945,926 | A | 8/1999 | Ammar et al. | |
| 6,163,320 | A | 12/2000 | Barcena et al. | |
| 6,233,522 | B1 | 5/2001 | Morici | |
| 6,278,799 | B1 | 8/2001 | Hoffman | |
| 6,388,607 | B1 | 5/2002 | Woodell | |
| 6,424,288 | B1 | 7/2002 | Woodell | |
| 6,512,527 | B1 | 1/2003 | Barber et al. | |
| 6,603,425 | B1 | 8/2003 | Woodell | |
| 6,690,298 | B1 | 2/2004 | Barber et al. | |
| 6,799,095 | B1 | 9/2004 | Owen et al. | |

(Continued)

OTHER PUBLICATIONS

Woo et al., "OpenGL Programming Guide," Chapters 2 and 6, 1997, 76 pages, Addison-Wesley Publishing Company.

(Continued)

*Primary Examiner* — Lun-Yi Lao
*Assistant Examiner* — Insa Sadio
(74) *Attorney, Agent, or Firm* — Donna P. Suchy; Daniel M. Barbieri

(57) ABSTRACT

A system for rendering point primitives for output to an electronic display includes electronics configured to determine a position of a point primitive within a sub-pixel grid. The electronics configured to determine a size of the point primitive and to determine a positional relationship between a pixel and the sub-pixel grid. The system includes a storage circuit configured to determine a first sample bit mask based on the size and based on the position of the point primitive. The system includes at least one set of selector circuits configured to select a second sample bit mask the size of the pixel based on the first sample bit mask and based on the positional relationship between the pixel and the sub-pixel grid. The second sample bit mask indicates which sub-pixels are to be illuminated on the electronic display to represent the point primitive.

20 Claims, 9 Drawing Sheets

U.S. PATENT DOCUMENTS

| | | | | |
|---|---|---|---|---|
| 7,023,375 | B2 | 4/2006 | Klausing | |
| 7,026,956 | B1 | 4/2006 | Wenger et al. | |
| 7,053,796 | B1 | 5/2006 | Barber | |
| 7,057,549 | B2 | 6/2006 | Block | |
| 7,064,680 | B2 | 6/2006 | Reynolds et al. | |
| 7,098,913 | B1 | 8/2006 | Etherington et al. | |
| 7,109,913 | B1 | 9/2006 | Paramore et al. | |
| 7,123,260 | B2 | 10/2006 | Brust | |
| 7,180,476 | B1 | 2/2007 | Guell et al. | |
| 7,191,406 | B1 | 3/2007 | Barber et al. | |
| 7,352,292 | B2 | 4/2008 | Alter et al. | |
| 7,375,678 | B2 | 5/2008 | Feyereisen et al. | |
| 7,379,796 | B2 | 5/2008 | Walsdorf et al. | |
| 2002/0158256 | A1 | 10/2002 | Yamada et al. | |
| 2004/0232844 | A1* | 11/2004 | Brown Elliott | 315/13.1 |
| 2009/0027416 | A1* | 1/2009 | Barone et al. | 345/611 |

OTHER PUBLICATIONS

Segal et al., "The OpenGL® Graphics System: A Specification", cover pages and pp. 90-101, 2004, Silicon Graphics, Inc.

Adams, Charlotte, "Synthetic Vision: Picturing the Future," *Avionics magazine, Solutions for Global Airspace Electronics*, Oct. 2006, cover and pp. 22-29.

Adams, Charlotte, "Synthetic Vision: Picturing the Future," *Avionics magazine*, Oct. 1, 2006, printed from website www.aviationtoday.com, 4 pages.

Blue Mountain Avionics' Products, printed from website www.bluemountainavionics.com on Aug. 28, 2007, 4 pages.

"MountainScope™ on a TabletPC," PCAvionics™, printed from website www.pcavionics.com on Aug. 28, 2007, 1 page.

"PCAvionics: Makers of MountainScope™, A New Dimension in Situational Awareness," PCAvionics™, printed from website www.pcavionics.com on Aug. 28, 2007, 1 page.

Pictures of DELPHINS, printed from website www.tunnel-in-the-sky.tudelft.nl on Aug. 28, 2007, 4 pages.

"TAWS Terrain Awareness and Warning System," Universal® Avionics, printed from website www.uasc.com on Aug. 28, 2007, 2 pages.

TAWS Class A and Class B, Terrain Awareness and Warning Systems, Universal® Avionics Systems Corporation, Sep. 2007, 6 pages.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Van Kasteren, Joost, :Tunnel-in-the-Sky, Synthetic vision simplifies the pilot's job and enhances safety, printed from website www.delftoutlook.tudelft.nl on Aug. 28, 2007, 13 pages.

* cited by examiner

SYSTEM AND METHOD FOR GRAPHICAL RENDERING OF POINT PRIMITIVES

BACKGROUND

The present disclosure relates generally to the field of computer graphic rendering. The disclosure more specifically relates to point primitive rendering of computer graphics.

General purpose computer graphics equipment has evolved greatly over the past few decades. High-performance graphics accelerator hardware is commonplace in personal computers. These hardware devices, and the software applications that run on the hardware, are conventionally based on the OpenGL, and DirectX graphics standards. Both of these standards define functionality that is used to render polygon, line, and point primitives. Furthermore, these standards define various anti-aliasing schemes that can improve overall image quality. For example, one of the more commonly used anti-aliasing schemes is called "multi-sampling". Multi-sampling divides each pixel into a set of smaller quanta called samples or sub-pixels. Rather than simply rendering the scene at the pixel level, multi-sampling renders at the sub-pixel level and then applies a filter to blend the sub-pixels together, yielding the final anti-aliased pixel color.

For point primitive rendering, the standards generally define two basic modes: jaggy and anti-aliased. When rendering jaggy points, each pixel determines if the point touches the pixel or not. If the pixel does touch the point the pixel is colored the point color, otherwise the point is discarded for that pixel. Jaggy point rendering may be simple and straightforward, but the resulting image quality is generally not acceptable for applications where point size and behavior on the display screen is important. For example, flight simulators used for pilot training may represent the individual lights along the edge of a runway. Lights at the near end of the runway should appear larger and brighter than those in the distance. Anti-aliased point rendering typically yields better results than jaggy rendering, but still falls short of the quality and brightness desired for pilot training.

In early days of flight simulation, custom built visual systems were conventionally used for pilot training. Calligraphic display devices where used because of their ability to display bright, crisp, and well behaved light points. Rather than paint the light points within a standard raster structure, the points were drawn one point at a time by steering the display's electron gun directly to where the light point should appear on the screen. This produced very high quality light point rendering, especially of night scenes. Such systems have been used for pilot training for several decades and many calligraphic systems have received FAA certification for commercial pilot training.

Calligraphic display devices and custom graphics hardware for driving a calligraphic display are typically costly to develop and produce. Modern computer based graphics devices are now readily available, along with industry standard raster-scan display devices, at a much lower price point. However, the commercially available graphics devices based on OpenGL and DirectX do not render point primitives at the same quality as the former calligraphic solutions. Obtaining bright light point rendering that is free from distracting artifacts is crucial to effective pilot training.

What is needed is a system and method for rendering point primitives that provide some of the characteristics of the older calligraphic solutions while using lower-cost raster display devices. There is also a need for a system and method for rendering bright and sharp point primitives without twinkle or scintillation as they move on the screen. What is also needed is a system and method that allows the point primitive to dynamically change size on screen without distracting artifacts by growing or decreasing its change in total brightness energy gradually and gracefully. What is also needed is a system and method that avoids scintillation when moving on the screen by maintaining constant energy for each point primitive. Preferably, the anti-aliasing method employed ensures that the point is displayed with the same total brightness energy regardless of where it lies on the pixels within the raster structure.

SUMMARY

One embodiment of the disclosure relates to a system for rendering point primitives for output to an electronic display. The system includes processing electronics configured to determine a position of a point primitive within a sub-pixel grid. The processing electronics are further configured to determine a size of the point primitive and to determine a positional relationship between a pixel and the sub-pixel grid. The system also includes a storage circuit configured to determine a first sample bit mask based on the determined size and based on the determined position of the point primitive. The system also includes at least one set of selector circuits configured to select a second sample bit mask the size of the pixel based on the first sample bit mask and based on the positional relationship between the pixel and the sub-pixel grid. The second sample bit mask indicates which sub-pixels within the pixel are to be illuminated on the electronic display to represent the point primitive.

Another embodiment of the disclosure relates to a method for rendering point primitives for output to an electronic display. The method includes determining a position of a point primitive within a sub-pixel grid using processing electronics. The method also includes determining a size of the point primitive using processing electronics. The method also includes determining a positional relationship between a pixel and the sub-pixel grid using processing electronics. The method further includes determining a first sample bit mask based on the determined size and based on the determined position of the point primitive using a storage circuit. The method further includes generating a second sample bit mask the size of the pixel based on the first sample bit mask and based on the positional relationship between the pixel and the sub-pixel grid using at least one set of selector circuits. The second sample bit mask indicates which sub-pixels within the pixel are to be illuminated on the electronic display to represent the point primitive.

Another embodiment of the disclosure relates to an apparatus for rendering point primitives for output to an electronic display. The apparatus includes means for determining a position of a point primitive within a sub-pixel grid. The apparatus also includes means for determining a size of the point primitive. The apparatus also includes means for determining a positional relationship between a pixel and the sub-pixel grid. The apparatus further includes means for determining a first sample bit mask based on the determined size and based on the determined position of the point primitive. The apparatus further includes means for generating a second sample bit mask the size of the pixel based on the first sample bit mask and based on the positional relationship between the pixel and the sub-pixel grid. The second sample bit mask indicates which sub-pixels within the pixel are to be illuminated on the electronic display to represent the point primitive.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
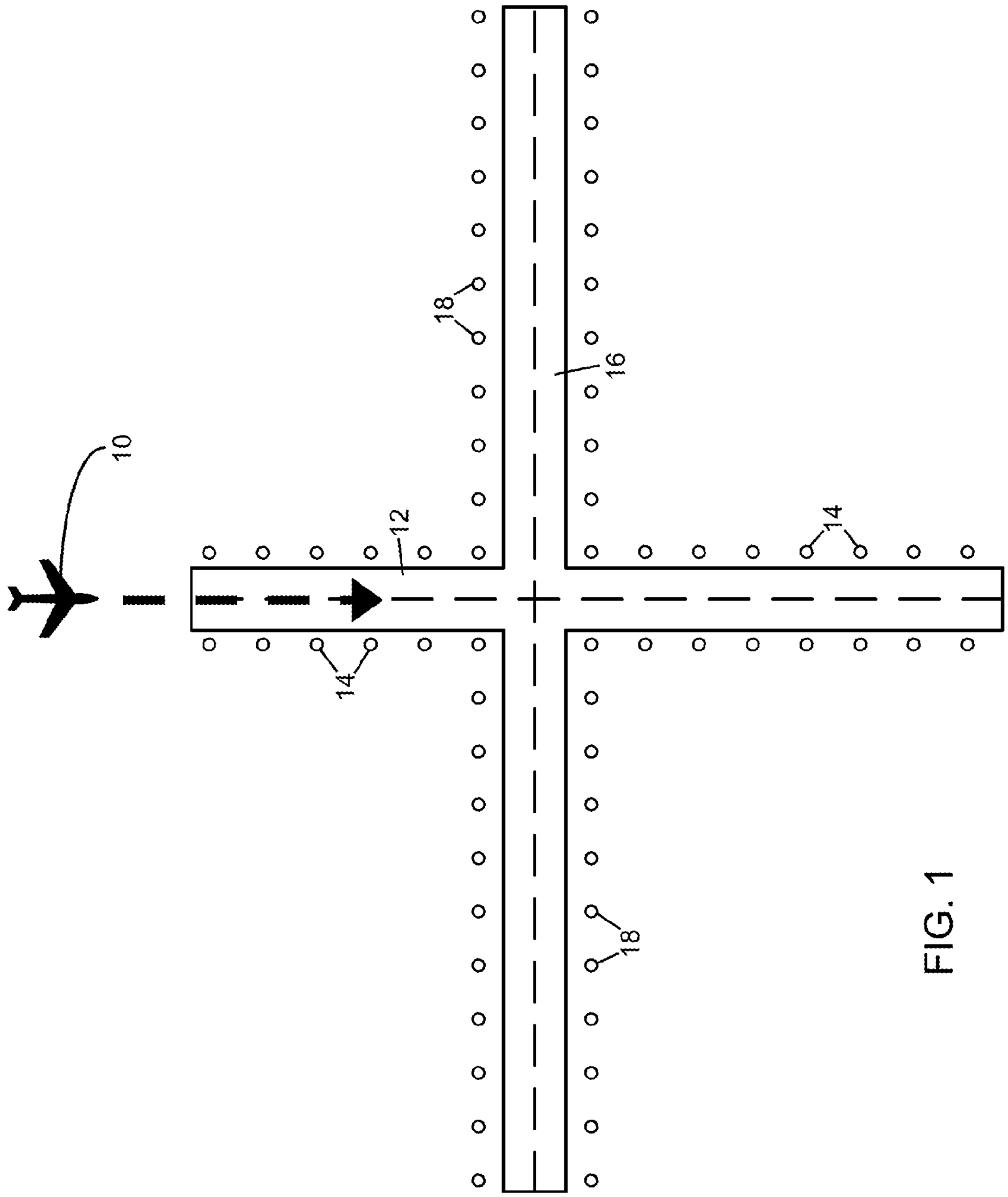
FIG. 1 is a schematic diagram of an aircraft approaching a runway for landing, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an aircraft 10 is approaching a runway 12 of an airport for landing. Runway 12 typically includes lights or light points 14 on each side of the runway to guide the pilot of aircraft 10 for landing. The airport may also include other runways or taxiways, such as runway/taxiway 16. Runway/taxiway 16 generally includes lights 18 along both sides to guide a pilot who is landing, taking off, or taxiing at the airport. A typical airport may include even further runways or taxiways and further light points. The display of the aircraft or the display of an aircraft simulator for training purposes should be capable of displaying each of these light points as accurately as possible so the pilot is not confused or distracted.

Figure 2:
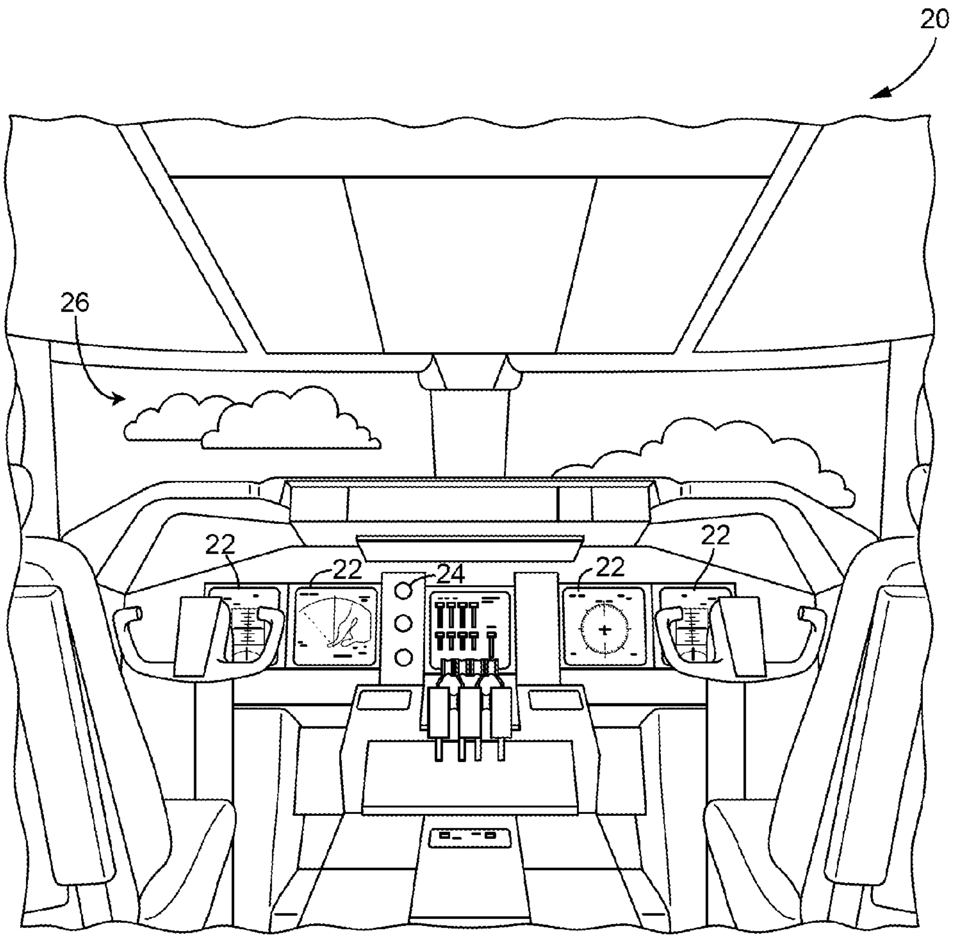
FIG. 2 is an illustration of an aircraft control center or cockpit, according to an exemplary embodiment.

Referring to FIG. 2, an illustration of an aircraft control center or cockpit 20 of aircraft 10 is shown, according to one exemplary embodiment. Aircraft control center 20 includes flight displays 22 which are used to increase visual range and to enhance decision-making abilities. In an exemplary embodiment, flight displays 22 can provide an illustration of an airport and associated lights of the airport. According to other exemplary embodiments, displays 22 can provide an illustration of an output from a radar system of aircraft 10. Furthermore, flight displays 22 can provide an output from safety or warning systems.

Aircraft control center 20 additionally includes one or more user interface (UI) elements 24. UI elements 24 can include dials, switches, buttons, touch screens, or any other user input device. UI elements 24 can be used to adjust features of flight displays 22, such as contrast, brightness, width, and length. UI elements 24 can also (or alternatively) be used by an occupant to interface with or change the displays of flight displays 22. UI elements 24 can additionally be used to acknowledge or dismiss an indicator provided by flight displays 22. Further, UI elements 24 can be used to correct errors on the electronic display An aircraft windshield or window scene 26 represents the pilot's view out the windows of an aircraft. For an actual aircraft, the view through windshield 26 would be the view of the world. In the case of a flight simulator, the view of window scene 26 may be a computer generated image of the world as seen on a display system. For example, the simulation user may view the terrain, structures, and light points of an airport displayed on the display system, Referring to FIG. 3, a system 30 is configured to render computer graphics, for example airport runways/taxiways and lights, to output the rendered graphics on display 22 or out window scene 26. According to one exemplary embodiment, system 30 includes graphics processing electronics 32, an electronic display 34, processing electronics 36, a user interface 38 (e.g., user interface 24), a memory 40, and external electronics 42.

Graphics processing electronics 32 are configured to render graphical images. Graphical processing electronics 32 may render at least point primitives, but may also be configured to render other primitives types such as lines and polygons. It is noted that while graphics processing electronics 32 is illustrated as being hardware, according to other exemplary embodiments, graphics processing electronics 32 may be software executed by processing electronics 36. Processing electronics 32 and 36 can include various types of processors, logic circuits, memories, etc. for implementing the operations described below.

Display 34 may be any display capable of representing the rendering received from graphics processing electronics 32 as a graphical image, for example to the pilot of aircraft 10. Display 34 may be of any technology (e.g. LCD, DLP, plasma, CRT, TFT, calligraphic display, etc.), configuration (e.g. portrait, landscape, or other), or shape (e.g. polygonal, curved, curvilinear).

Processing electronics 36 may be any electronics configured to perform processing, for example a computer processor or processing system for performing non-graphical rendering functions and for providing an indication of graphics to be rendered to graphics processing electronics 32. User interface 38 may be any tactile interface or voice command interface configured to receive user commands. Memory 40 can be any volatile and/or a non-volatile memory capable of storing information (e.g., instructions, data, etc.) used by general processing electronics 36 or graphics processing electronics 32.

System 300 may further be coupled to external electronics 42 for receiving data to be graphically rendered and output to display 34. For example, external electronics 42 may be a GPS device for receiving global positioning information from satellites, a radar antenna for receiving weather and/or terrain/obstacle information, a wireless transceiver for receiving graphical information from a remote source (e.g., air traffic control, a ground radar, an aircraft or other vehicle, the Internet, etc.), another local computing system, a terrain/obstacle database, a simulator host computer, etc.

It is noted that according to other exemplary embodiments, various components of system 30 may be omitted and/or additional components may be added to system 30. For example, external electronics 42 may be omitted while additional displays may be added.

System 30 may render and display dials, gauges, text, and various primitive types for use on flight displays 22. Furthermore, system 30 may render and display realistic world views on window scene 26. These renderings typically include polygons, lines, and point primitives and thus the system is configured to render polygons, lines, and point primitives.

Traditional anti-aliasing schemes such as multi-sampling may be used to improve overall image quality of these computer generated images. Standard multi-sampling generally works well for polygon anti-aliasing, but it is not necessarily ideal for point rendering.

Figure 4A:
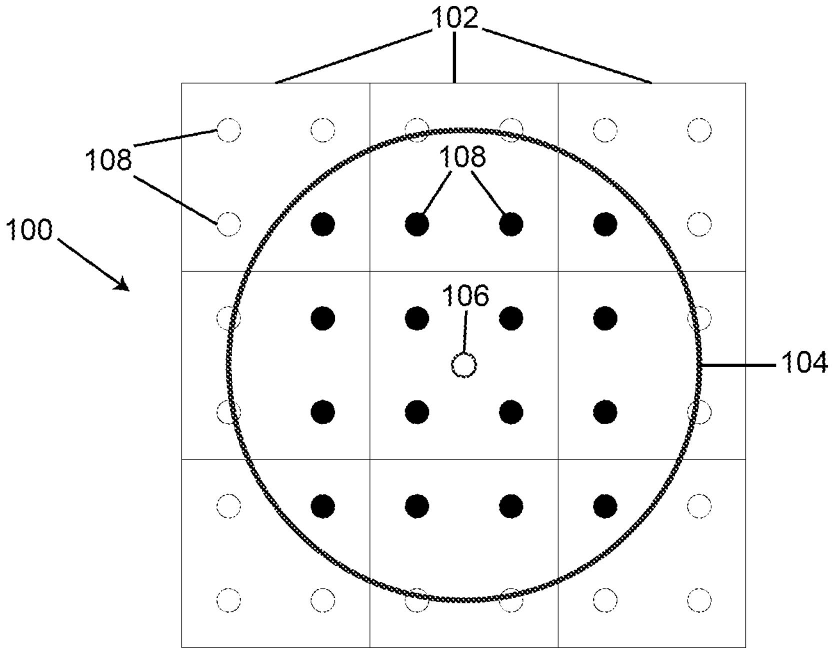
FIGS. 4A and 4B illustrate a point primitive rendered with a non-constant energy multi-sampling scheme.
Figure 4B:
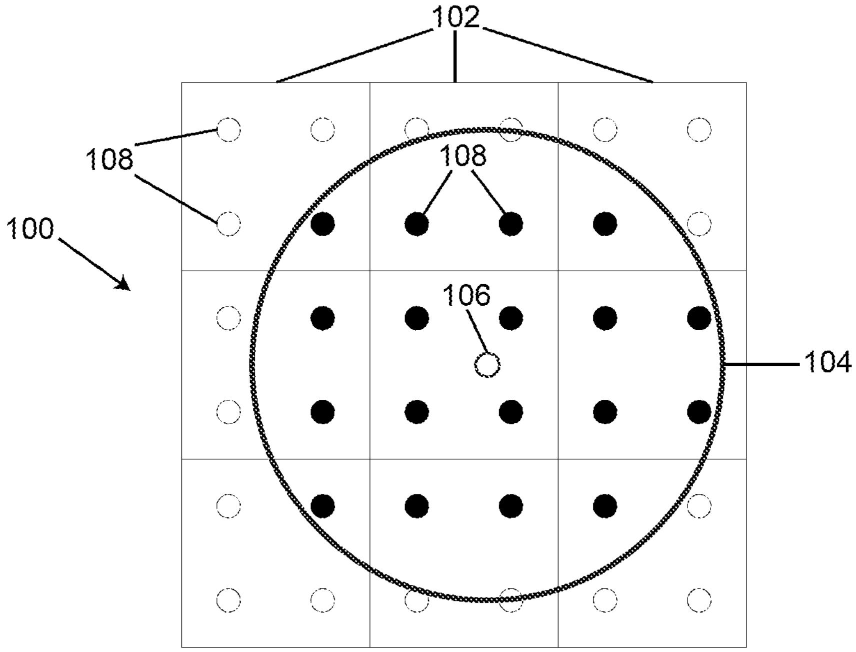

Referring to FIGS. 4A and 4B, a point primitive rendering technique is illustrated with two different point positions. Each square 102 represents a pixel within a raster structure 100. A circle 104 represents a point primitive, with a dot 106 representing its center position. Each pixel 102 contains four samples 108 used for anti-aliasing. For example, for a simple filter kernel, the color assigned to each sample 108 within a pixel 102 can be averaged to obtain a final pixel color.

Solid dots represent sub-pixels that lie within point primitive 104 while hollow dots lie outside primitive 104. From this information a filter kernel can compute the percentage of the pixel covered by primitive 104, and thus the amount of point color to contribute to the pixel. These filtered values would be:

| Pixel values (FIG. 4A) | | | Pixel values (FIG. 4B) | | |
|---|---|---|---|---|---|
| 0.25 | 0.5 | 0.25 | 0.25 | 0.5 | 0.25 |
| 0.5 | 1.0 | 0.5 | 0.5 | 1.0 | 1.0 |
| 0.25 | 0.5 | 0.25 | 0.25 | 0.5 | 0.25 |

Note that the rendering for FIG. 4A has a total of sixteen samples 108 that lie within circle 104. In the rendering of FIG. 4B, point 104 has been moved slightly to the right. Notice that for FIG. 4B point primitive 104 claims or uses eighteen samples 108. Pixel 102 in the center row and right column changed from using two of four samples 108 (which would yield a ½ brightness pixel) to using four of four samples 108 (or full brightness). Therefore, as point primitive 104 moves through raster structure 100, its brightness (or intensity) may change or twinkle. In fact, this change in brightness may also have the visual appearance of the point changing in size. Thus, this multi-sampling technique does not yield constant energy (or brightness) when rendering round point primitives.

Although rendering approaches may differ, this example illustrates potential problems that may be encountered when rendering points (e.g., point 104). For applications such as pilot training, these brightness changes can be distracting to the pilot and reduce the training effectiveness of the visual system. As the point moves on the screen, the point will appear to grow and shrink in size as well as change brightness depending on where the point's center lies relative to the pixel structure To avoid these distracting artifacts under motion, an object generally must contribute the same amount of energy (brightness) to the scene regardless of where that object lies within the scene. In essence, an object of a given size should contribute "constant energy" to the scene no matter how it moves in relation to the pixel structure. To achieve good image quality in a dynamically moving computer generated scene, an anti-aliasing filter kernel and the primitive under motion should obey constant energy criteria. This criterion is especially important when rendering very small but high contrast primitives—such as light points.

To avoid these motion artifacts, custom visual systems used with calligraphic displays may employ anti-aliasing schemes that guarantee constant energy for light points. Furthermore, the apparent size of the calligraphic point can be altered by defocusing the electron beam. By changing the size of the point, it may be possible to simulate the effects of perspective growth; namely that near field lights are larger on screen than more distant points.

For a raster-based system to approach the quality of a calligraphic system the points must be rendered with constant energy and it should be possible to gracefully vary their size on screen. For a multi-sampling architecture, this suggests that for a given point size the same total brightness be used regardless of the point's position. It does not require that exactly the same number of pixels be touched, but the filtered sum of all touched pixels should remain constant. For illustrative purposes, a flat spatially invariant filter kernel will be assumed. Therefore, to provide constant energy (or brightness), the point contributes the same number of sub-pixels to the scene. As a point moves on the display and a new sample is chosen, an old sample is given up to maintain the same total count.

Implementation of a "constant energy" solution can be difficult due to precision issues in a digital computer. As was illustrated in FIGS. 4A and 4B it is not sufficient to determine how many sub-pixels lie within the area of the point. As the circular point moves through the rectangular pixel structure, the sample count changes.

Figure 5:
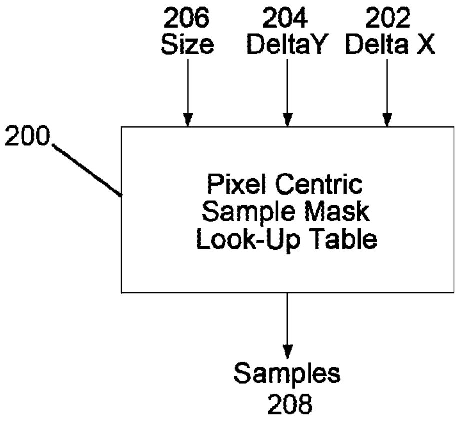
FIG. 5 is a constant energy point primitive look-up table using a pixel centric approach, according to an exemplary embodiment.

One constant energy solution is to use a look-up table 200, as illustrated in FIG. 5. Look-up table 200 is addressed with positional information (e.g., x 202 and y 204) and point size 206 information (e.g., radius). With careful construction of the contents of the look-up table, it may be possible to guarantee constant energy point primitive rendering.

Figure 6A:
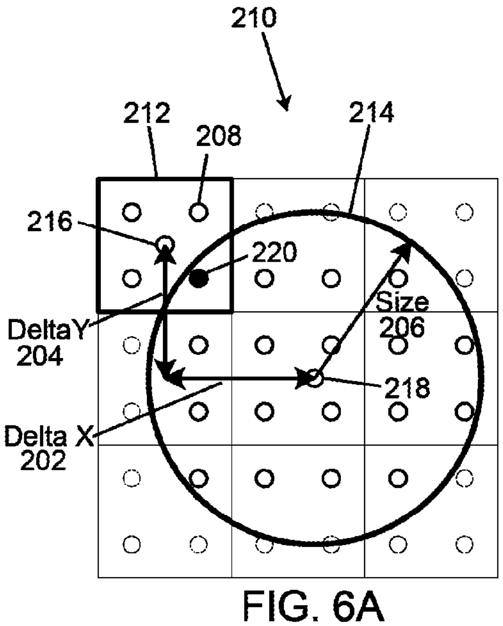
FIGS. 6A and 6B illustrate application of the pixel centric constant energy look-up table of FIG. 2, according to an exemplary embodiment.
Figure 6B:
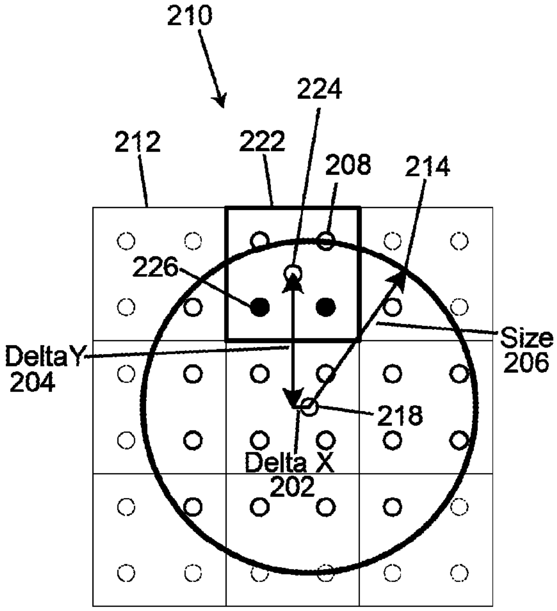

Operation of look-up table 200 is illustrated with reference to FIGS. 6A and 6B. A position 218 of the point is known (e.g., loaded from memory, input from a user interface, generated by processing electronics, etc.) relative to the pixel structure 210 and a size 206 of the point is also be known. To provide smooth motion of a moving point, the position may be specified to a fraction of a pixel in precision. For each pixel touched by the point, the distance between the pixel's position 216 and the point's position is computed. These DeltaX 202 and DeltaY 204 distances provide two of the address fields in to the look-up table, with the size parameter providing the third term. The contents of the look-up table indicate which of the sub-pixels 208 within the current pixel lie within the point. For example, the pixel 212 highlighted in FIG. 6A yields the lower right sub-pixel 220 as being inside the point while the others lie outside. Stepping to the next pixel 222 in FIG. 6B causes DeltaX to change by exactly one pixel. The fractional bits of position within the pixel remain unchanged. The look-up table can now indicate that the two lower sub-pixels 226 of pixel 222 lie within the point.

Constant energy can be maintained by exploiting the knowledge that the point's position does not change as the system steps through the pixels touched by the point. Each pixel touched by the point may claim some fraction of the total number of samples allocated for a given point size. The table is constructed so that the sum of all these pixel locations add to the same value for a given point size. As the point moves, a new sample may not get picked up until a previously claimed sample is given up, thus maintaining constant energy. Simple algebraic calculations do not yield this constant energy result. For example, the right most pixel of the center row would not be allowed to claim all four samples unless some other pixels gave up a total of two samples (assuming that a total sample count of 16 is appropriate for the point size). Each entry in the table is constructed by knowing the relationship of all other pixel locations touched by the same point. FIGS. 6A and 6B illustrate only two of nine pixels touched by the example point. All nine pixels are considered as a whole when constructing the table to ensure that the grand total yields the same sample count.

The look-up table can yield constant energy point primitive rendering and can support lights of variable size, but the implementation can be costly. For example, assume a positional accuracy of ¼ of a pixel is needed in both x and y. Also suppose that we want to render points up to two pixels in radius. The DeltaX and DeltaY terms therefore include sign bit, two integer bits, and two fractional bits each. Thus, five bits are used for DeltaX 202 and five bits for DeltaY 204. Without any size address bits, a 1024 deep look-up table would be used. To support smooth growth of point size, the size parameter would also include fractional bits as well as integer bits. No sign bit is needed because the size is always positive. For our example of points up to two pixels in radius, the system uses two integer bits and at least two fractional bits, for an additional 4 bits of size 206 to bring the table up to 16 k words of depth. Higher positional precision or larger size ranges may use even more bits, making this solution challenging to implement. If such large look-up tables are impractical, it may be necessary to either give up positional precision or reduce the number of point sizes supported by the table.

This example is not intended to represent all constant energy solutions, but merely to illustrate one possible method. Because constant energy rendering is not a high priority for most graphics applications, most commercially available off-the-shelf solutions (such as OpenGL or DirectX devices) do not support any form of constant energy rendering. Therefore, the use of such graphics devices for pilot training or other point sensitive applications can be problematic.

The exemplary embodiment illustrated in FIG. 5 is "pixel centric. With the pixel centric approach, the look-up table may be addressed with the positional relationship between the pixel and the point. The look-up table contents include a mask indicating which sub-pixels are inside the point. A different table look-up is performed for each pixel touched by the point. The total sum of these pixel touches yields constant energy.

Figure 7:
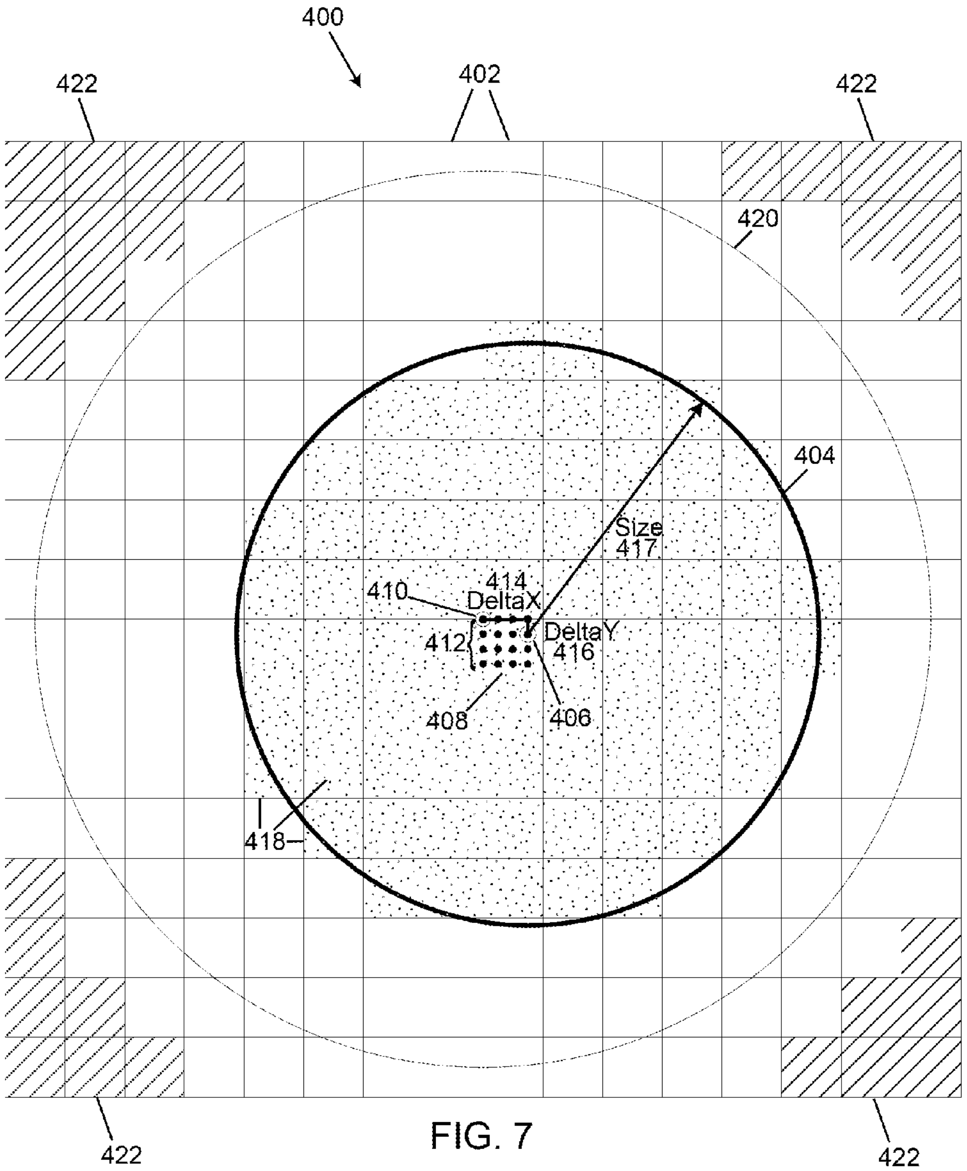
FIG. 7 illustrates application of a point centric look-up table, according to an exemplary embodiment.

FIG. 7 illustrates a "point centric" approach according to various exemplary embodiments of this disclosure. With the point centric approach, the table address is based on the position of the point within a single sub-pixel, regardless of where that sub-pixel lies on screen. A look-up is performed for the entire point, and the pixel samples are extracted from this all inclusive set of samples. This exemplary embodiment generates a bit mask that is centered on the point and not the pixel. Following the look-up, the sample mask can be aligned to the pixel structure.

Because the look-up table is point position centric, the number of x and y distance address bits used can be reduced in exchange for more point size address bits. The positional data may only span to the next sub-pixel location and not across multiple pixels. Reducing the number of positional address bits allows for an increase in the number of bits allocated to point size.

FIG. 7 illustrates the point position centric look-up table concept according to an exemplary embodiment. A look-up table structure 400 includes a 16×16 grid of sub-pixel regions 402. A point center or origin 406 of a point 404 resides inside a single sub-pixel 408. The look-up table is defined relative to sub-pixel 408 containing the point's center. As illustrated, sub-pixel 408 is located near a grid center or origin 410. The look-up table need not consider where the sub-pixel lies relative to the raster structure, but may only consider the least significant bits of the point position to identify where point 404 lies within sub-pixel area 408. The table does not need to know which sub-pixel 402 on the screen the point primitive falls in—only where within the sub-pixel the point lies. This particular example assumes a regular sub-pixel structure is used, however according to other exemplary embodiments, other structures such as triangles, diamonds, circles, etc. may be used.

Valid point positions 412 are defined by the number of positional bits of precision used within the sub-pixel. For this example, valid point positions are indicated at ¼ sub-pixel precision by small black dots. In other words, with two bits of x and y positional information, each sub-pixel 402 (e.g., sub-pixel 408) includes a 4×4 matrix of possible point positions 412. Therefore, for this example, the system only needs two bits for an x distance 414 and two bits for a y distance 416 as address data for the look-up table. In this example, the point 406 is centered to the right ¾ of sub-pixel 408 in the x direction, and down ¼ of sub-pixel 408 in the y direction. This is in contrast with the five bits used for x and y in the approach illustrated in FIG. 5.

Inner circle 404 represents an example point at this position, with a given size parameter 417. Stippled sub-pixels 418 are sub-pixels that can be used by point 404 (75 in this example). As point center 406 moves to any of the sixteen allowed positions 412, the same number of sub-pixels 418 can be used, but not necessarily the exact same set of sub-pixels 418. Therefore, we can increase the likelihood of or ensure constant energy.

A large outer circle 420 represents the largest point size that can be totally contained within grid 400. If the system steps largest point 420 through all allowed positions 412, corner samples 422 may never be used. Unused samples 422 can be left out of the look-up table to reduce its size.

Figure 8:
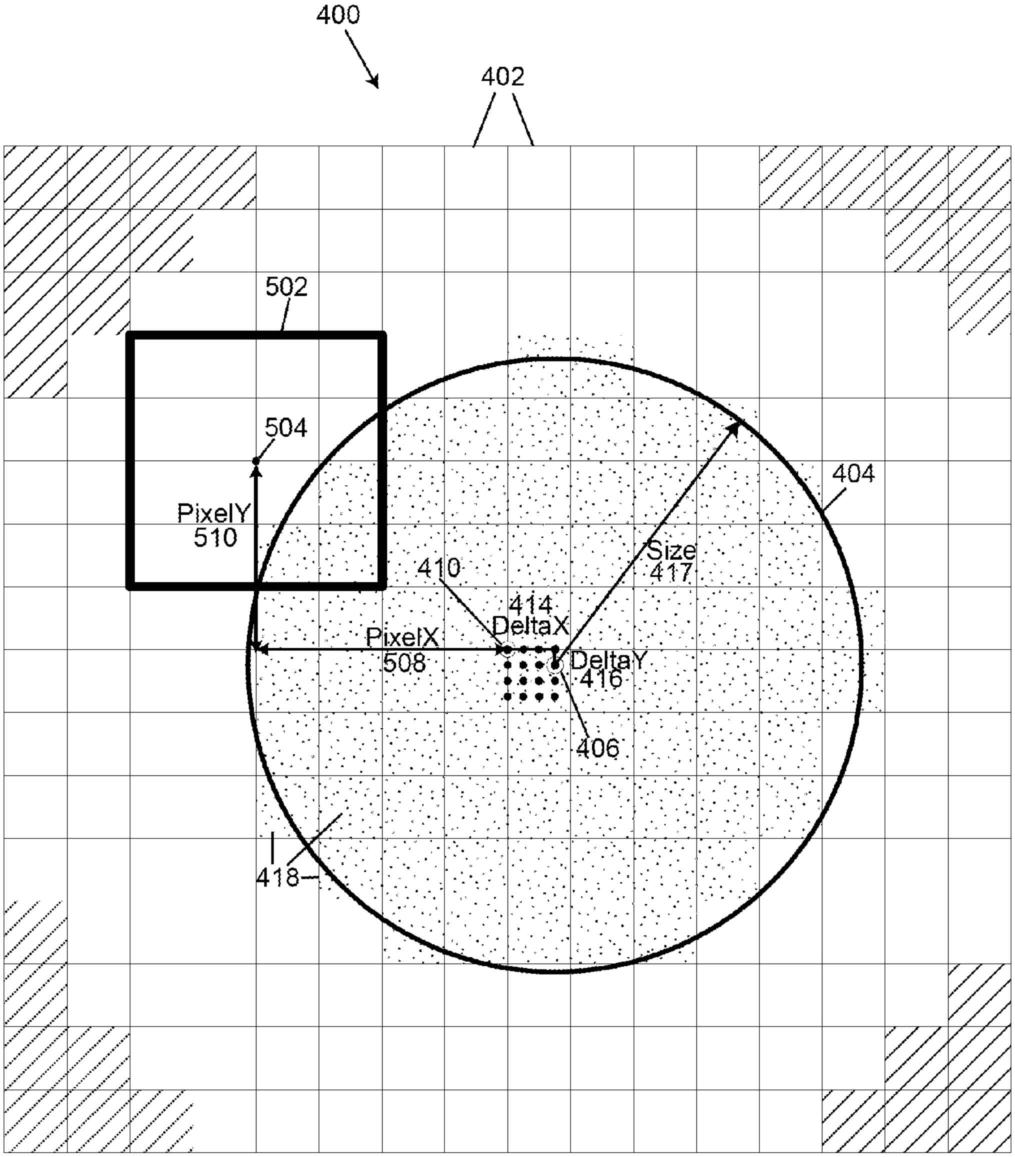
FIG. 8 illustrates application of the point centric pattern of FIG. 7 to a pixel, according to an exemplary embodiment.

Because this pattern is point centric and not pixel centric, the next step is to determine how to allocate the claimed sub-pixels 418 to the pixel structure. FIG. 8 illustrates how one pixel may align with the samples generated by the point centric table according to an exemplary embodiment. To find this pixel alignment, the system can now examine the upper bits of the position of point 404. The upper bits indicate how many sub-pixel units 402 away a pixel center or origin 504 is from grid center 410 (not point center 406) in an x direction or PixelX 508 and a y direction or PixelY 510. In other words, the least significant bits provide DeltaX 414 and DeltaY 416 within a sub-pixel while the upper bits provide PixelX 508 and PixelY 510 indicating how far away the pixel center is in sub-pixel sized units.

In this example, pixel 502 includes a 4×4 grid of sub-pixels 402 and defines a pixel-window view into the point centric grid 400. Each of the sub-pixels 402 that lie inside pixel 502 can be applied to pixel 502. After determining which of sub-pixels 402 to use in pixel 502, the system can step to a next pixel and so on until point 404 has been completely rendered. Constant energy may be ensured because the look-up table generates all of the sub-pixels to be assigned to the point, and those sub-pixels are allocated to the appropriate touched pixels. All positional locations of the table for a given point size yield the same total sample count.

Figure 9:
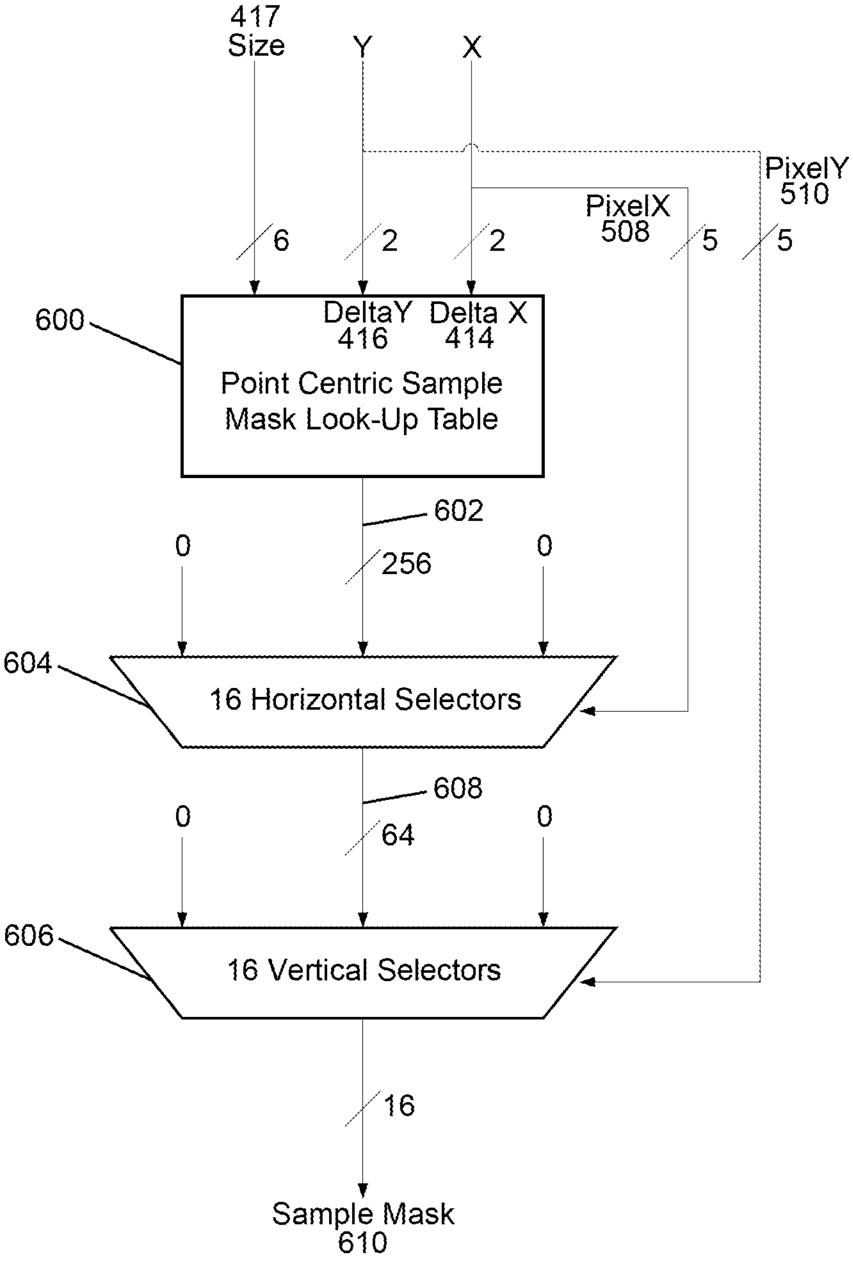
FIG. 9 is a block diagram of a point centric look-up table that may be used with the applications of FIGS. 7 and 8, according to an exemplary embodiment.

Referring to FIG. 9, a block diagram illustrates a look-up table 600 to correlate the example of FIGS. 7 and 8 according to an exemplary embodiment. Look-up table 600 generates a 16×16 (or 256 bit) sample bit mask 602. Table 600 is addressed with two bits of x (DeltaX 414) and two bits of y positional information (DeltaY 416), indicating where within a sub-pixel the point (e.g., point 404) resides. Table 600 is also addressed with size or radius bits 417 (Notice that with six bits of size the table is 1024 locations deep—the same table depth as FIG. 5, but with no size bits).

Assuming 4×4 sub-pixels are applied to each pixel (e.g., pixel 502), six size bits 417 allow a point diameter between zero and just less than four pixels in size (or 16 sub-pixels). The least significant size bit may be chosen such that small points have an incremental step in size and yield an increase of only one additional sub-pixel being used. In other words, a least significant bit change in size can cause the area within the point's surrounding circle to change by no more than one sub-pixel's worth of area. This may allow points to grow dynamically without distractive popping or obvious changes in size or brightness.

Look-up table 600 is followed by a series of multiplexers or selectors; a series of horizontal barrel selectors 604 (e.g., 16 barrel shifters for a 4×4 pixel) and a series of vertical selectors 606 (e.g., 16 barrel shifters for a 4×4 pixel). Horizontal selectors 604 receive bit mask 602 from table 600 as well as the upper bits of x (PixelX 508) to determine how far and in which direction (based on the sign) to shift or slide the point-centric pattern to produce horizontal alignment with the pixel being rendered (e.g., pixel 502). In the example of FIG. 8, pixel 502 aligns with the third through the sixth column of grid 400. Horizontal selectors 604 pass these columns and discard the rest to prune or reduce the grid (e.g., grid 400) from 16×16 down to a 4×16 bit mask 608.

Vertical selectors 606 receive reduced bit mask 608 from horizontal selectors 604 as well as the upper bits of y (PixelY 510) to determine how far and in which direction (based on the sign) to shift the point-centric pattern to produce vertical alignment with the pixel being rendered (e.g., pixel 502). In the example of FIG. 8, pixel 502 aligns with the fourth through seventh rows. This prunes the grid (e.g., grid 400) down to a 4×4 sub-pixel sample mask 610 needed for the particular pixel (e.g., pixel 502).

It is noted that while the illustrated exemplary embodiment separates the barrel shifting into horizontal and vertical operations, according to other exemplary embodiments the horizontal and vertical barrel shifting can be performed in a single circuit or step, or in either order.

The system can then step to the next pixel touched by the point (e.g. point 404). Look-up table 600 may yield the same 16×16 bit mask (and thus constant energy) for the next pixel and only the barrel shift operation may change as the system steps through the pixels. Therefore, the circuit may be reasonably cost effective and yield constant energy point rendering for variable sized points. Furthermore, the circuit may provide better than sub-pixel positional accuracy and single sample growth step sizes for small points.

It should be noted that constant energy point rendering may become less important as the point grows in size. For small sizes, a change of a single sample could cause very apparent changes in brightness and/or size as the point moves on screen. As a point grows in size, the total number of samples also grows and a change of a few samples becomes less significant. Points larger than about three or four pixels in diameter may have a negligible benefit from constant energy solutions assuming sufficient sub-pixels are used along with a quality anti-aliasing filter. Therefore, a system may use the constant energy solution of FIGS. 7-9 (or similar) for small point rendering and then switch to a non-constant energy approach for points larger than a predefined threshold. Thus, the system may be capable of supporting variable point sizes from zero up to a value much larger than the constant energy size that look-up table 600 supports.

Figure 10:
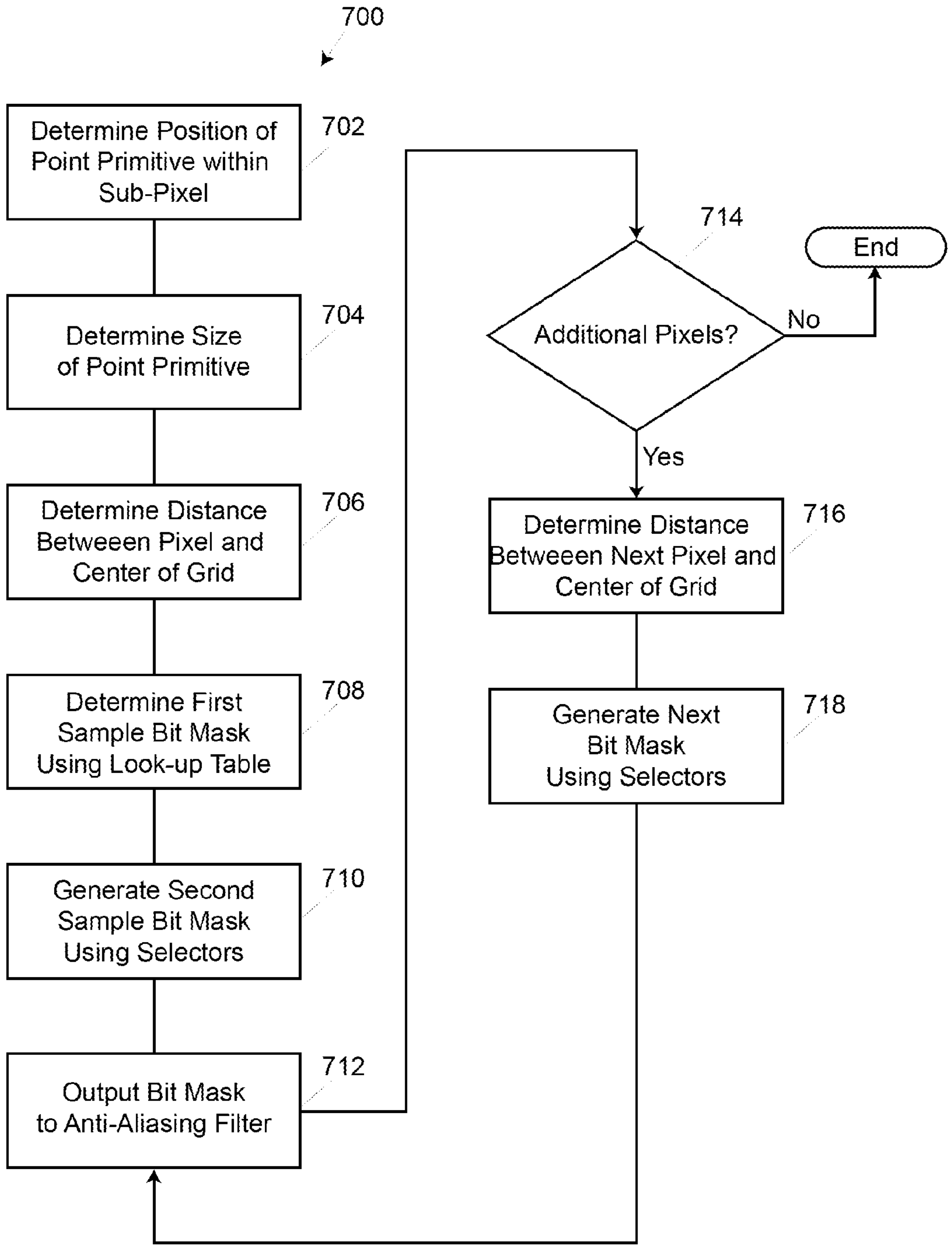
FIG. 10 is a flow chart of a method for rendering point primitives according to an exemplary embodiment.

Referring to FIG. 10, a method 700 is configured to render point primitives as illustrates in FIGS. 7-9 for output to an electronic display, according to an exemplary embodiment. At a step 702, the system determines a position 406 of point primitive 404 within sub-pixel 408 of pixel grid 400. The position may include x coordinate DeltaX 414 and y coordinate DeltaY 416. At a step 704, the system determines size 417 (e.g., a radius) of point primitive 404.

At a step 706, the system determines a distance between origin 504 of pixel 502 and origin 410 of sub-pixel grid 400 on which point primitive 404 and pixel 502 exist. The distance may include x coordinate PixelX 508 and y coordinate PixelY 510.

At a step 708, look-up table 600 determines first sample bit mask 602 based on determined size 417 and based on determined position 414, 416 of the origin 406 of point primitive 404.

At a step 710, selectors 604 and 606 generate second sample bit mask 610 the size of pixel 502 based on first sample bit mask 602 and based on position 508, 510 of the origin 504 of pixel 502 and origin 406 of pixel grid 400. Sample bit mask 610 is configured to indicate which sub-pixels within pixel 502 are to be illuminated on the electronic display to represent point primitive 404. At a step 712, sample bit mask 610 is output to the anti-aliasing filter.

At a step 714, the system checks where additional pixels are to be processed. If additional pixels are not present or do not need to be processed, method 700 may end. If additional pixels do exist or are to be processed, at a step 716 a distance between the next pixel and origin 406 of the grid is determined. At a step 718, the next bit mask for output to the display is generated by selectors 604 and 608 based on bit mask 602 and the positional coordinates between the next pixel and origin 406 of pixel grid 400. The look-up table does not need to be addressed again for the current rendering of point 404 (until point 404 changes) and only selectors 604 and 606 need to be addressed. The bit mask for the next pixel is then output to the filter at step 712 and the system repeats by checking if any additional pixels are to be processed.

It is noted that while the steps of method 700 are illustrated in a specific order, the steps may be rearranged. For example, the radius of the point primitive may be determined before the position of the point primitive is determined. According to other exemplary embodiments, some steps may be omitted or additional steps may be added. For example, the bit mask may not be output to the filter until each pixel is processed for the current point primitive or generation of the bit mask at steps 710 or 718 may take multiple steps using multiple sets of selectors.

Figure 3:
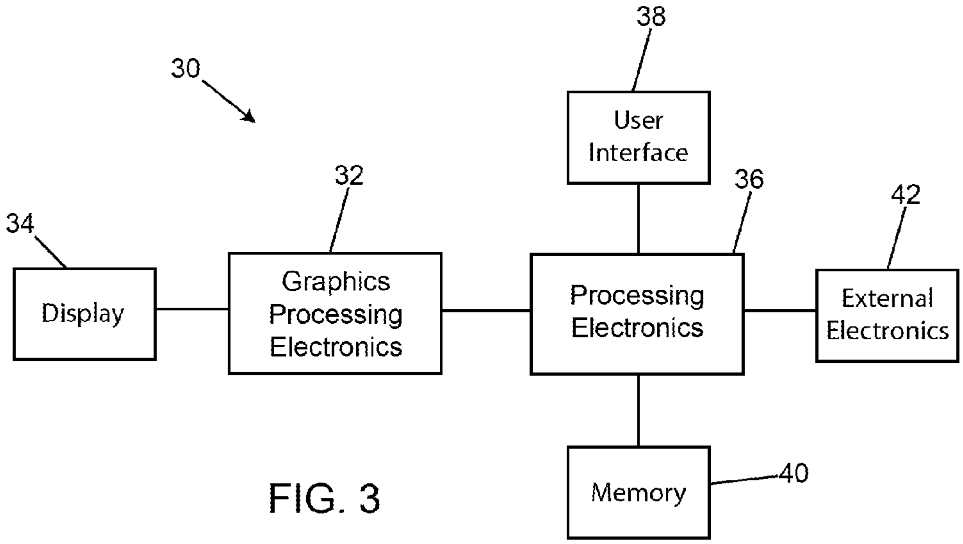
FIG. 3 is a block diagram of a graphics processing system of the aircraft of FIGS. 1 and 2, according to an exemplary embodiment.
Figure 11:
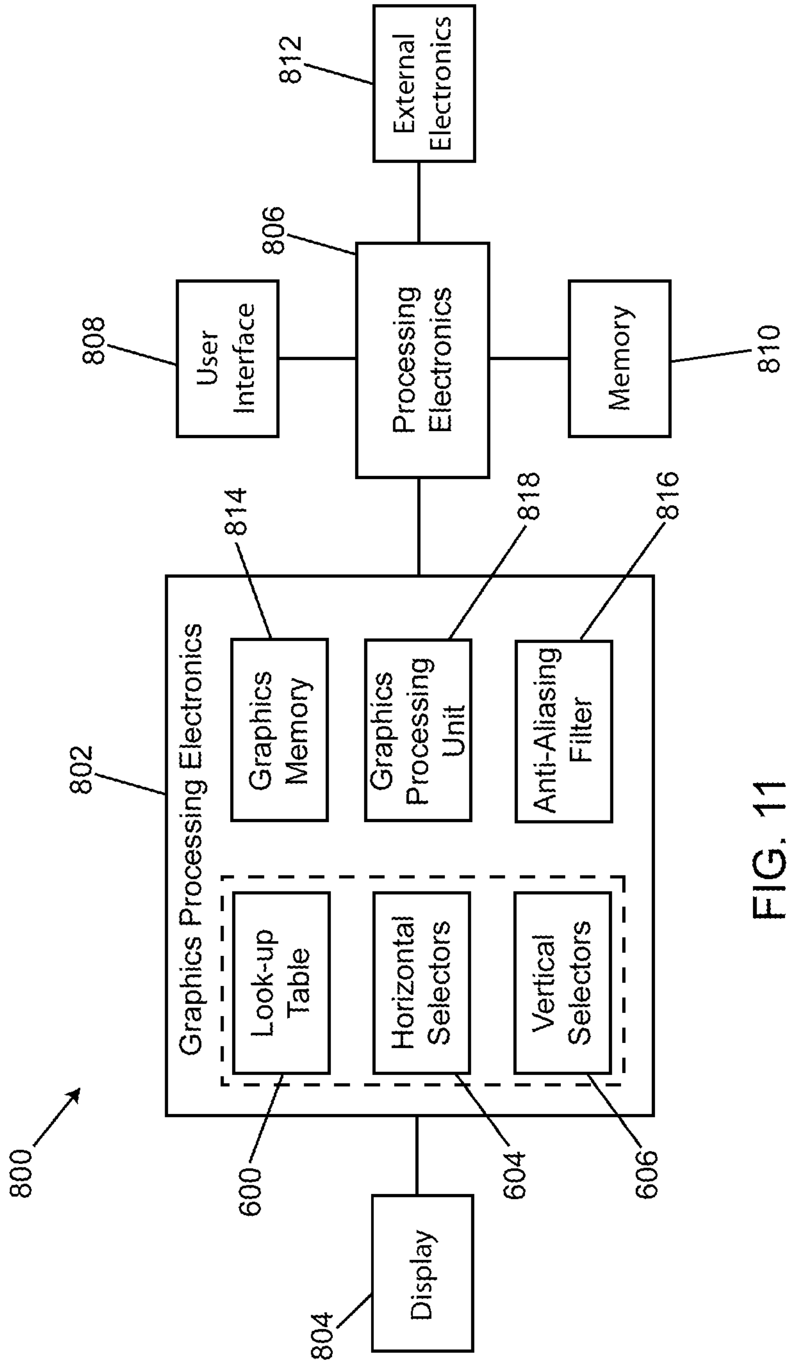
FIG. 11 is a block diagram of a graphics processing system including the look-up table of FIG. 9, according to an exemplary embodiment.

Referring to FIG. 11, a system 800 is a more detailed version of system 30 of FIG. 3 and is configured to render computer graphics using one or more of the circuits and methods described above and to output the rendered graphics on a display. According to one exemplary embodiment, system 800 includes graphics processing electronics 802, a display 804, processing electronics 806, a user interface 808, a memory 810, and external electronics 812.

Graphics processing electronics 802 is configured to render at least point primitives, but may also be configured to render other primitives types such as lines and polygons. Graphics processing electronics 802 includes look-up table 600, horizontal selectors 604, and vertical selectors 606. Graphics processing electronics 802 may also include a graphics memory 814, an anti-aliasing filter 816, and a graphics processing unit 818. Look-up table 600, horizontal selectors 604, and vertical selectors 606 may have the same function as described with reference to FIGS. 7-9, but according to other exemplary embodiments, the selectors can be omitted and the look table can operate similar to the exemplary embodiments described with reference to FIGS. 4-6.

Graphics memory 814 is generally configured to store data related to a graphic to be rendered, for example one or more next primitives, alternative look-up table configurations for different display configurations, rendered primitives ready for display, etc. Graphics memory 814 can be any volatile and/or a non-volatile memory. According to some exemplary embodiments, look-up table 600, horizontal selectors 604, and vertical selectors 606 may be stored in memory 814 as computer code and/or data. Graphics processing unit 818 may retrieve the stored data and/or execute the stored computer code to use the look-up table and selectors 604, 606.

Anti-aliasing filter 816 is configured to reduce distortion artifacts when rendering primitives of any type. To support constant energy rendering of point primitives, the anti-aliasing filter kernel is configured for constant energy. In other words, the integral of the filter kernel swept across the screen yields a flat field.

Graphics processing unit 818 may be any electronic device or processing device configured to control the rendering of computer graphics within graphics processing electronics 802. Graphics processing unit 818 may receive an indication of graphics to render from general processing electronics 806, may breakdown the graphics into primitives to be rendered, may output rendered primitives to display 804, may access graphics memory 814, and/or may determine the primitive type, primitive size, DeltaX values, DeltaY values, pixel size, PixelX values, PixelY values, etc.

It is noted that while graphics processing electronics 802 is illustrated as being hardware, according to other exemplary embodiments, graphics processing electronics 802 may be software executed by processing electronics 806.

Display 804 may be any display capable of representing the rendering received from graphics processing electronics 802 as a graphic image. Display 804 may be of any technology (e.g. LCD, DLP, plasma, CRT, TFT, calligraphic display, etc.), configuration (e.g. portrait, landscape, or other), or shape (e.g. polygonal, curved, curvilinear).

Processing electronics 806 may be any electronics configured to perform processing of non-graphical rendering functions and output an indication of graphics to be rendered to graphics processing electronics 802, for example a computer processor or processing system. User interface 808 may be any tactile interface or voice command interface configured to receive user commands for processing by general processing electronics 806. Memory 810 can be any volatile and/or a non-volatile memory capable of storing information used by processing electronics 806.

System 800 may further be coupled to external electronics 812 for receiving data to be graphically rendered and output to display 804. For example, external electronics 812 may be a GPS device for receiving global positioning information from satellites, a radar antenna for receiving weather and/or terrain/obstacle information, a wireless transceiver for receiving graphical information from a remote source (e.g., air traffic control, a ground radar, an aircraft or other vehicle, the Internet, etc.), another local computing system, a terrain/obstacle database, a flight simulator host computer, etc.

It is noted that according to other exemplary embodiments, various components of system 800 may be omitted and/or additional components may be added to system 800. For example, external electronics 812 may be omitted while additional displays may be added.

The exemplary embodiments described above support high quality point rendering with 16 samples per pixel for constant energy points up to four pixels in diameter. Other exemplary embodiments, however, support implementations with a different number of samples or a different upper limit on point size. Furthermore, other exemplary embodiments include variations of sub-pixel arrangements and alternate distributions of selectors and look-up table sizes. Further still, other exemplary embodiments may include pixels of sizes other than 4×4 sub-pixels and grid sizes other than 16×16 sub-pixels or 4×4 pixels. According to other exemplary embodiments, the grid may be an irregular grid (e.g., not square or circular) of sub-pixels with the look-up table using additional positional address bits to generate the bit mask.

It is noted that while the described and illustrated exemplary embodiments use a look-up table, according to other exemplary embodiments the look-up table could be any storage circuit (or storage construct executed by processing electronics) capable of storing point and/or pixel information and capable of being addressed and accessed by processing electronics.

While the exemplary embodiments described above are generally disclosed with reference to a flight simulation application, according to other exemplary embodiments the disclosed graphical rendering systems and methods can be used with any system that renders point primitives for illustration on a display. For example, the graphical rendering may be output to an aircraft display, a land vehicle display (e.g., an automobile, a tank, etc.), a household or commercial display (e.g., a television, a computer monitor, etc.), a mobile or handheld display (e.g., a cellular phone, a handheld media device, a PDA, etc.), etc.

It is to be understood that the above-referenced arrangements are illustrative of the application for the principles of the present invention and disclosure. It will be apparent to those of ordinary skill in the art that numerous modifications can be made without departing from the principles and concepts of the invention as set forth in the claims.

What is claimed is:

1. A system for rendering point primitives for output to an electronic display, comprising:

processing electronics configured to determine a position of a point primitive within a sub-pixel grid, the processing electronics further configured to determine a size of the point primitive, the processing electronics further configured to determine a positional relationship between a pixel and the sub-pixel grid;

a storage circuit configured to determine a first sample bit mask based on the determined size and based on the determined position of the point primitive; and at least one set of selector circuits configured to select a second sample bit mask the size of the pixel based on the first sample bit mask and based on the positional relationship between the pixel and the sub-pixel grid, the second sample bit mask indicating which sub-pixels within the pixel are to be illuminated on the electronic display to represent the point primitive.

2. The system of claim 1, wherein the processing electronics are further configured to determine a positional relationship between a second pixel and the point primitive, the at least one set of selector circuits being further configured to generate a third sample bit mask the size of the second pixel based on the first sample bit mask and the determined positional relationship between the second pixel and the sub-pixel grid, the third sample bit mask indicating which sub-pixels within the second pixel are to be illuminated on the electronic display to represent the point primitive.

3. The system of claim 2, wherein the determining a positional relationship and generating a bit mask are repeated for each pixel the point primitive at least partially overlaps.

4. The system of claim 1, wherein the at least one set of selector circuits comprises a first set of selector circuits aligned with a first coordinate axis and a second set of selector circuits aligned with a second coordinate axis, the first set of selector circuits receiving a coordinate on the first coordinate axis of the positional relationship between the pixel and the sub-pixel grid, the second set of selector circuits receiving a coordinate on the second coordinate axis of the positional relationship between the pixel and the sub-pixel grid.

5. The system of claim 1, wherein the at least one set of selector circuits comprises barrel shifter or multiplexer circuits and/or the storage circuit comprises a look-up table.

6. The system of claim 1, wherein the sub-pixel grid is rectangular and the at least one set of selector circuits comprises a selector circuit for each row of the sub-pixel grid and a selector circuit for each column of the sub-pixel grid.

7. The system of claim 1, wherein multiple point primitives are rendered with sizes ranging from zero to a size determined by the sub-pixel grid size.

8. The system of claim 7, wherein point primitives larger than the sub-pixel grid size are rendered using an alternate solution.

9. The system of claim 1, wherein at least a portion of the sub-pixels at the corner of the grid are omitted because they lie outside the largest point size within the pixel grid.

10. The system of claim 1, wherein the point size comprises enough bits to allow an incremental size change on a small point primitives to alter the resulting sample bit mask by no more than one sample at a time.

11. A method for rendering point primitives for output to an electronic display, comprising:

determining a position of a point primitive within a sub-pixel grid using processing electronics;

determining a size of the point primitive using processing electronics;

determining a positional relationship between a pixel and the sub-pixel grid using processing electronics;

determining a first sample bit mask based on the determined size and based on the determined position of the point primitive using a storage circuit; and generating a second sample bit mask the size of the pixel based on the first sample bit mask and based on the positional relationship between the pixel and the sub-pixel grid using at least one set of selector circuits, the second sample bit mask indicating which sub-pixels within the pixel are to be illuminated on the electronic display to represent the point primitive.

12. The method of claim 11, further comprising:

determining a positional relationship between a second pixel and the point primitive using the processing electronics, generating a third sample bit mask the size of the second pixel based on the first sample bit mask and the determined positional relationship between the second pixel and the sub-pixel grid using the at least one set of selector circuits, the third sample bit mask indicating which sub-pixels within the second pixel are to be illuminated on the electronic display to represent the point primitive.

13. The method of claim 12, wherein the determining a positional relationship and generating a bit mask are repeated for each pixel the point primitive at least partially overlaps.

14. The method of claim 11, wherein the at least one set of selector circuits comprises a first set of selector circuits aligned with a first coordinate axis and a second set of selector circuits aligned with a second coordinate axis, the first set of selector circuits receiving a coordinate on the first coordinate axis of the positional relationship between the pixel and the sub-pixel grid, the second set of selector circuits receiving a coordinate on the second coordinate axis of the positional relationship between the pixel and the sub-pixel grid.

15. The method of claim 11, wherein the at least one set of selector circuits comprises barrel shifter or multiplexer circuits and/or the storage circuit comprises a look-up table.

16. The method of claim 11, wherein the sub-pixel grid is rectangular and the at least one set of selector circuits comprises a selector circuit for each row of the sub-pixel grid and a selector circuit for each column of the sub-pixel grid.

17. The method of claim 11, wherein multiple point primitives are rendered with sizes ranging from zero to a size determined by the pixel grid size.

18. The method of claim 17, wherein point primitives larger than the sub-pixel grid size are rendered using an alternate solution.

19. The method of claim 11, wherein the point size comprises enough bits to allow an incremental size change on a small point primitives to alter the resulting sample bit mask by no more than one sample at a time.

20. An apparatus for rendering point primitives for output to an electronic display, comprising:

means for determining a position of a point primitive within a sub-pixel grid;

means for determining a size of the point primitive;

means for determining a positional relationship between a pixel and the sub-pixel grid;

means for determining a first sample bit mask based on the determined size and based on the determined position of the point primitive; and means for generating a second sample bit mask the size of the pixel based on the first sample bit mask and based on the positional relationship between the pixel and the sub-pixel grid, the second sample bit mask indicating which sub-pixels within the pixel are to be illuminated on the electronic display to represent the point primitive.

* * * * *